United States Patent
Jagota

(10) Patent No.: US 8,150,540 B2
(45) Date of Patent: Apr. 3, 2012

(54) CONTROLLER AND METHOD FOR CONTROLLING CONVERTERS OF DISPARATE TYPE

(75) Inventor: Anurag Jagota, Plano, TX (US)

(73) Assignee: Lineage Power Corporation, Plano, TX (US)

( * ) Notice: Subject to any disclaimer, the term of this patent is extended or adjusted under 35 U.S.C. 154(b) by 406 days.

(21) Appl. No.: 12/212,626

(22) Filed: Sep. 17, 2008

(65) Prior Publication Data

US 2010/0067267 A1 Mar. 18, 2010

(51) Int. Cl.
*G05B 11/01* (2006.01)

(52) U.S. Cl. .......................... 700/22; 700/297

(58) Field of Classification Search .............. 700/22, 700/286, 297, 298; 307/44, 45, 64, 80, 82, 307/87; 363/69; 713/300
See application file for complete search history.

(56) References Cited

U.S. PATENT DOCUMENTS

| | | |
|---|---|---|
| 4,451,773 A | 5/1984 | Papathomas et al. |
| 5,594,286 A | 1/1997 | Tachikawa |
| 5,654,592 A | 8/1997 | Butler et al. |
| 5,740,023 A | 4/1998 | Brooke et al. |
| 5,986,434 A | 11/1999 | Roy et al. |
| 6,262,900 B1 | 7/2001 | Suntio |
| 6,462,969 B1 | 10/2002 | Sato et al. |
| 6,614,130 B2 | 9/2003 | Wilhelm |
| 6,614,133 B2 * | 9/2003 | Belson et al. ............ 307/58 |
| 6,630,750 B2 | 10/2003 | McAndrews |
| 6,680,855 B1 | 1/2004 | Rundkvist et al. |
| 7,315,156 B2 | 1/2008 | Chapuis |
| 7,394,445 B2 | 7/2008 | Chapuis et al. |
| 7,719,808 B2 * | 5/2010 | Phadke et al. ............ 361/79 |
| 2008/0259646 A1 * | 10/2008 | Moussaoui ............... 363/17 |
| 2009/0217060 A1 * | 8/2009 | Tsuchiya ................ 713/300 |
| 2009/0271642 A1 * | 10/2009 | Cheng et al. ............ 713/300 |

FOREIGN PATENT DOCUMENTS

JP 2008204231 A * 9/2008

OTHER PUBLICATIONS

Machine Translation of JP 2008-204231 A.*
English human translation of JP 2008-204231 A.*
Machine Translation of JP 2008-204231 A (Sep. 2008).*
English Human Translation of JP 2008-204231 A (Sep. 2008).*

* cited by examiner

*Primary Examiner* — Ryan Jarrett

(57) ABSTRACT

A converter controller and a method of controlling converters. In one embodiment, the converter controller includes: (1) a converter efficiency database configured to store data pertaining to efficiencies of converters, (2) a power requirement assessor configured to compare ratings of online ones of the converters to an output power requirement of a given output power bus and (3) a controller mode selector coupled to the power requirement assessor and configured to retrieve online and standby converter efficiencies from the converter efficiency database, assess efficiencies of alternative converter combinations appropriate for the output power requirement and place one of the alternative converter combinations online.

20 Claims, 3 Drawing Sheets

CONTROLLER AND METHOD FOR CONTROLLING CONVERTERS OF DISPARATE TYPE

TECHNICAL FIELD

The invention is directed, in general, to power supply controllers and, more specifically, to a controller and method for controlling converters of disparate type.

BACKGROUND

Telecommunication service providers use geographically distributed "central offices" (COs) to provide local telephone service to surrounding residential neighborhoods and businesses. As part of the service, COs also provide the electricity necessary to operate all line-powered customer equipment, primarily plain-old telephone service (POTS) telephones, within the CO service area. The electricity takes the form of direct current, or DC, power.

COs use multiple converters operating in parallel to provide the DC power. A system controller coordinates the operation of the multiple converters at each CO to ensure that they cooperate to provide the desired DC voltage and current. Since good CO design mandates converter redundancy, standby converters are almost always available to take the place of failing or failed converters. The system controller is able to detect and replace failing or failed converters with the standby converters.

As the cost of commercial power rises, the cost of operating COs rises. Telecommunication service providers therefore routinely replace older and less efficient converters at COs with newer and more efficient types. More efficient converters not only draw less AC power, they generate less heat, resulting in lower CO cooling costs. Unfortunately, converters represent a significant capital investment, so they are often replaced incrementally over a period of time as part of a long-term upgrade plan. That period of time often spans years, so today's typical CO likely contains a variety of different converter types having a range of efficiencies.

SUMMARY

One aspect of the invention provides a converter controller. In one embodiment, the converter controller includes: (1) a converter efficiency database configured to store data pertaining to efficiencies of converters, (2) a power requirement assessor configured to compare ratings of online ones of the converters to an output power requirement of a given output power bus and (3) a controller mode selector coupled to the power requirement assessor and configured to retrieve online and standby converter efficiencies from the converter efficiency database, assess efficiencies of alternative converter combinations appropriate for the output power requirement and place one of the alternative converter combinations online.

Another aspect of the invention provides a method of controlling converters. In one embodiment, the method includes: (1) comparing ratings of online ones of the converters to an output power requirement of a given output power bus, (2) retrieving online and standby converter efficiencies, (3) assessing efficiencies of alternative converter combinations appropriate for the output power requirement and (4) placing one of the alternative converter combinations online.

Yet another aspect of the invention provides a controller for controlling converters of disparate type. In one embodiment, the controller includes: (1) a converter efficiency database configured to store data pertaining to efficiencies of the converters, (2) a power requirement assessor configured to gather data regarding ratings of the converters and compare ratings of the online ones of the converters to an output power requirement of a given output power bus, (3) a controller mode selector coupled to the power requirement assessor and configured to retrieve online and standby converter efficiencies from the converter efficiency database, assess efficiencies of alternative converter combinations appropriate for the output power requirement and place one of the alternative converter combinations online and (4) a converter efficiency analyzer coupled to the converter efficiency database and configured to analyze the converters to determine the efficiencies and provide the data to the converter efficiency database.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION OF CERTAIN ASPECTS AND EMBODIMENTS

As stated above, today's typical CO likely contains a variety of different converter types having a range of efficiencies. The converters frequently have different output current ratings as well. Unfortunately, while conventional system controllers are effective at coordinating converters having different output current ratings, they do not take converter efficiencies into account when deciding which converters should be online and which should be on standby. It has been found that better efficiency may be attained if the system controller were capable of prioritizing converter operation based on their actual operating efficiency. The system controller can also test standby converters occasionally to assess their efficiency without significantly affecting the overall improved performance of the CO. Accordingly, described herein are various embodiments of a controller and method for controlling converters of disparate efficiency. One embodiment to be illustrated and described controls converters of disparate efficiency such that a peak efficiency point (PEP) is reached.

Figure 1:
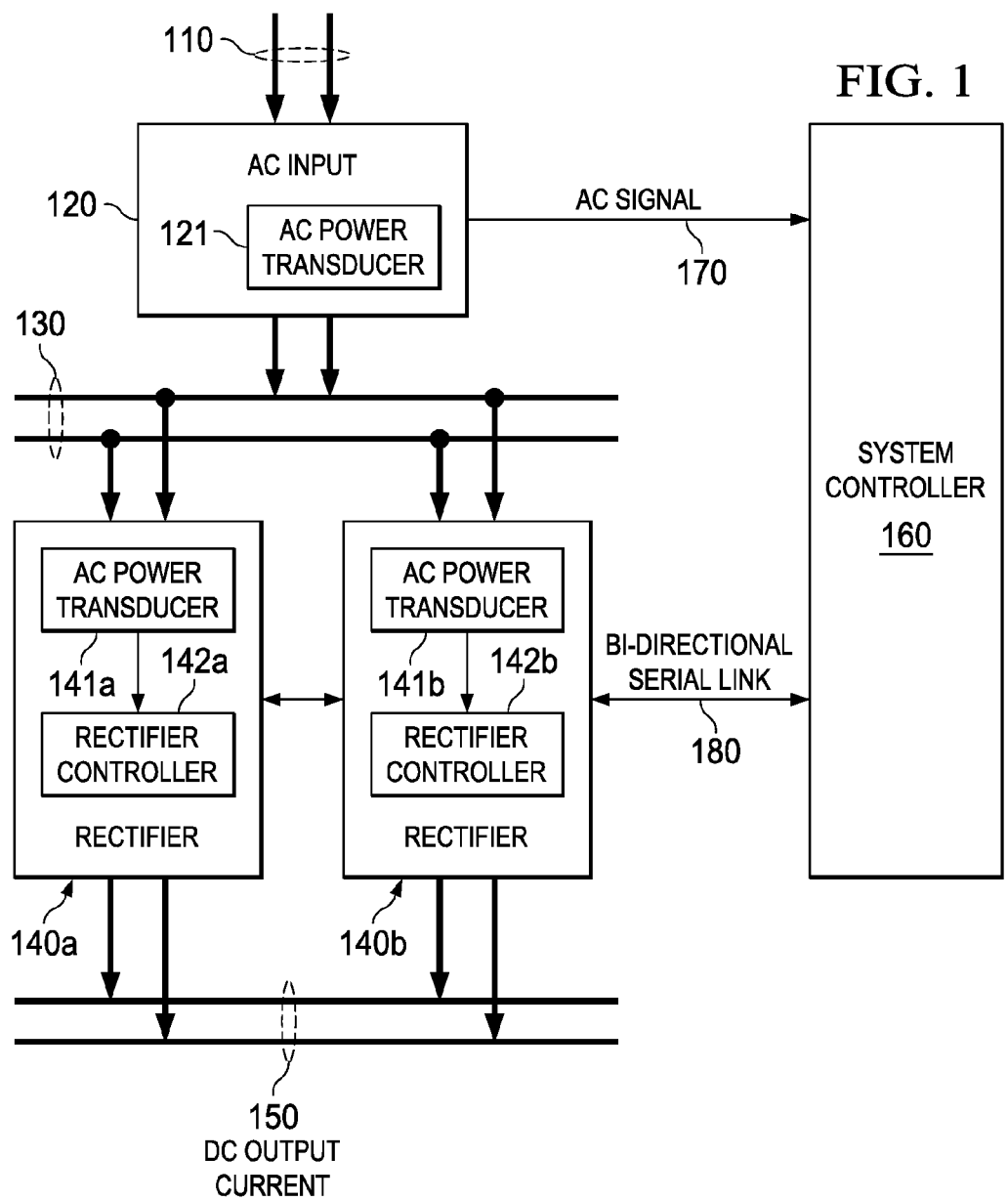
FIG. 1 is a block diagram of a typical CO that forms one environment within which a controller constructed according to the principles of the invention may operate.

FIG. 1 is a block diagram of a typical CO that forms one environment within which a controller constructed according to the principles of the invention may operate. In the example of FIG. 1, the CO employs converters that convert alternating current (AC) to DC. As those skilled in the pertinent art are aware, AC-DC converters are more commonly called rectifiers. Alternative CO examples employ DC-DC converters instead of or in addition to rectifiers.

The example CO receives commercial AC power from an external power source via lines 110 at an AC input 120. The AC input 120 includes an AC power transducer 121 configured to measure AC power flow into the AC input 120. Typically the AC power transducer 121 includes a current sensor, though this need not be the case.

An AC power bus 130 is coupled to the AC input 120 and conveys the AC power to multiple converters, two of which are shown and referenced as rectifiers 140a, 140b. In the example of FIG. 1, the converters 140a, 140b are modular and mounted on shelves in one or more equipment racks (not shown). While not necessary, rack-mounting allows converters to be removed and replaced with less effort and allows the CO to be neatly organized. Each of the rectifiers includes an AC power transducer 141a, 141b coupled to an AC input thereof and configured to produce a signal indicating an AC power flow into the respective rectifiers 140a, 140b. As with the AC power transducer 121, the AC power transducers 141a, 141b typically include a current sensor, though this need not be the case.

Each of the rectifiers 140a, 140b also includes a rectifier controller 142a, 142b. The rectifier controllers 142a, 142b are configured to control power switching and transfer circuitry (not shown) within the rectifiers 140a, 140b such that desired output voltages and currents are maintained on one or more DC power buses 150 in accordance with predetermined power quality specifications (e.g., ripple or total harmonic distortion). In the example of FIG. 1, the output current is adjustable by means of commands provided to the rectifiers 140a, 140b. By means of other commands, the rectifiers 140a, 140b may be placed in a standby mode (in which the rectifier controllers 142a, 142b are powered, but the rectifiers 140a, 140b do not contribute output current to the DC power bus 150) and an online mode (in which the rectifiers 140a, 140b contribute a commanded level of output current to the DC power buses 150).

A system controller 160 is coupled to the AC power transducer via an AC signal line 170. The AC signal line 170 allows the system controller 160 to sense the power flow into the AC input 120. The system controller 160 is also coupled to each of the rectifiers 140a, 140b via a bi-directional link. In the example of FIG. 1, the link 180 is a serial link such as an I2C, RS-232 or RS-422 serial bus. However, the link 180 may be of any conventional or later-developed type and is not constrained to be a serial link. The rectifiers 140a, 140b are addressable, allowing the system controller 160 to receive data from each of the rectifiers 140a, 140b, including their respective AC power transducers 141a, 141b, via the link 180. The link 180 also allows the system controller 160 to issue commands to, for example, adjust the output current of each of the rectifiers 140a, 140b or selectively place the rectifiers 140a, 140b in a standby mode or an online mode.

The above-described system controller 160 may be embodied in whole or in part in a general-purposed data processing and storage system, in which case one or more of the power requirement assessor 240, the controller mode selector 250, the other control functions 260 and the controller efficiency analyzer 280 would be embodied in at least one sequence of computer instructions.

Figure 2:
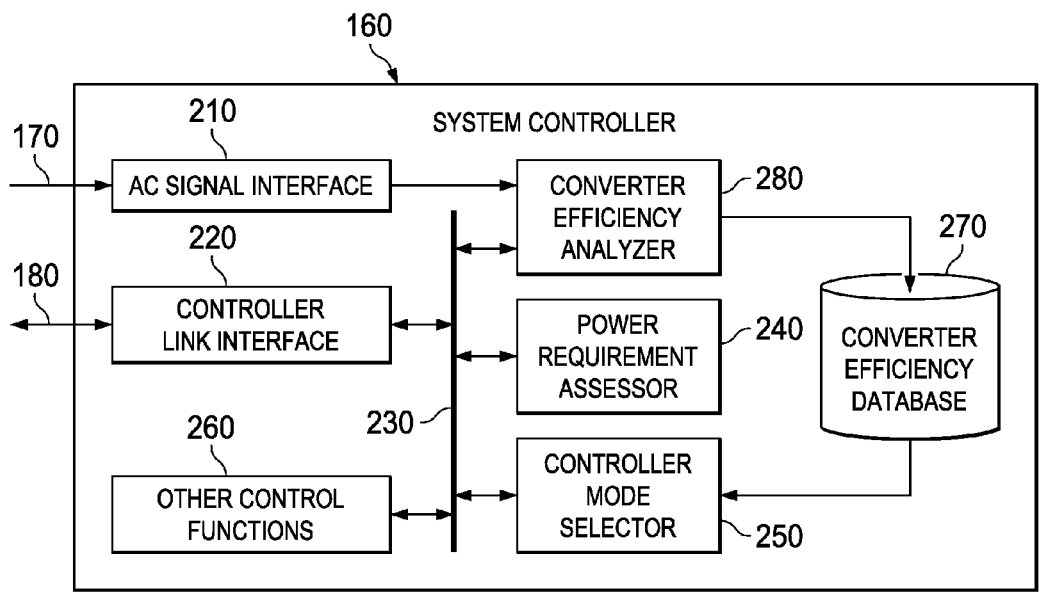
FIG. 2 is a block diagram of one embodiment of a controller for controlling converters of disparate type carried out according to the principles of the invention.

FIG. 2 is a block diagram of one embodiment of the system controller 160 of FIG. 1. The system controller 160 includes an AC signal interface 210 configured to be coupled to the AC signal line 170 of FIG. 1. The system controller 160 also includes a controller link interface 220 configured to be coupled to the bi-directional link 180 of FIG. 1. An internal data bus 230 is coupled to the controller link interface 220 and allows various functional units in the system controller 160 to communicate with the bi-directional link 180 via the controller link interface 220.

The system controller 160 includes a power requirement assessor 240. The power requirement assessor 240 is coupled to the internal data bus 230 and is configured to compare the ratings of online converters to the output power requirement of a given output power bus. In making its assessment, the power requirement assessor 240 is configured to gather data regarding the ratings of online ones of the rectifiers via the bi-directional link 180 and the controller link interface 220. In a first example, if six rectifiers rated at 137 A and 24V each are providing power to a certain output power bus that is required to operate at 500 A and 24V, the power requirement assessor 240 will assess the ratings (6×137 A) to exceed the requirement (500 A) by 322 A. In fact, the power requirement assessor 240 may determine that two of the rectifiers may be placed in standby mode while still meeting the 500 A requirement. In a second example, if the output power requirement of the output power bus suddenly becomes 1000 A at 24V, more rectifiers need to be brought online. In fact, since the total current rating of the rectifiers currently online is 822 A, rectifiers having a total current rating of at least 178 A need also to be brought online.

The system controller 160 further includes a controller mode selector 250. The controller mode selector 250 is coupled to the internal data bus 230 and is configured to retrieve online and standby converter efficiencies from a converter efficiency database 270, assess the efficiency of alternative converter combinations appropriate for the requirement and place the most efficient combination of converters online. The converter efficiency database 270 is configured to store data pertaining to the efficiency of converters. Continuing with the above first example, the controller mode selector 250 retrieves data from the converter efficiency database 270 and assesses the efficiencies of the six disparate online rectifiers to be as follows:

| Converter ID | Output Amp. | Output Voltage | Rack No. | Shelf No. | Efficiency |
|---|---|---|---|---|---|
| 98920/1 | 137 | 24 | 1 | 1 | 92% |
| 146E53 | 137 | 24 | 1 | 2 | 90% |
| 001-00157 | 137 | 24 | 1 | 4 | 88% |
| 001-00156 | 137 | 24 | 2 | 2 | 88% |
| 001-00091 | 137 | 24 | 2 | 5 | 82% |
| 05-1342 | 137 | 24 | 3 | 1 | 61% |

The converter IDs are arbitrary and meant to imply that the converters were manufactured by more than one company. Accordingly, the controller mode selector 250 determines that the rectifiers having the 61% and 82% efficiencies should be placed on standby. The controller mode selector 250 then issues appropriate commands to the rectifiers via the internal data bus 230, the controller link interface 230 and the bi-directional link 180 of FIG. 1. In the above second example, the controller mode selector 250 retrieves standby converter efficiencies from the converter efficiency database 270 and assesses the efficiencies of the four disparate standby rectifiers as follows:

| Converter ID | Output Amp. | Output Voltage | Rack No. | Shelf No. | Efficiency |
|---|---|---|---|---|---|
| 04-0030 | 137 | 24 | 1 | 3 | 60% |
| 03-45290 | 137 | 24 | 2 | 4 | 58% |
| 03-0756 | 137 | 24 | 3 | 3 | 42% |
| 02-71342 | 137 | 24 | 3 | 5 | 40% |

Again, the converter IDs are arbitrary. The controller mode selector 250 determines that the rectifiers having the 60% and 58% efficiencies should be placed online. The controller mode selector 250 then issues appropriate commands to the rectifiers via the internal data bus 230.

The system controller 160 is capable of performing other control functions, e.g., coordinating the output currents of the converters to perform load balancing, conducting general diagnostic testing, soft starting or stopping of the converters and gathering performance data for later analysis. Thus, the embodiment of FIG. 2 shows other control functions 260 as being coupled to the internal data bus 230.

The system controller 160 further includes a converter efficiency analyzer 280. The converter efficiency analyzer 280 is coupled to the AC signal interface 210 and the internal data bus 230. The converter efficiency analyzer 180 is one way by which the converter efficiency database 270 may be populated with converter efficiency data. One embodiment of a method that the converter efficiency analyzer 180 may carry out will be illustrated and described in FIG. 4, below.

Figure 3:
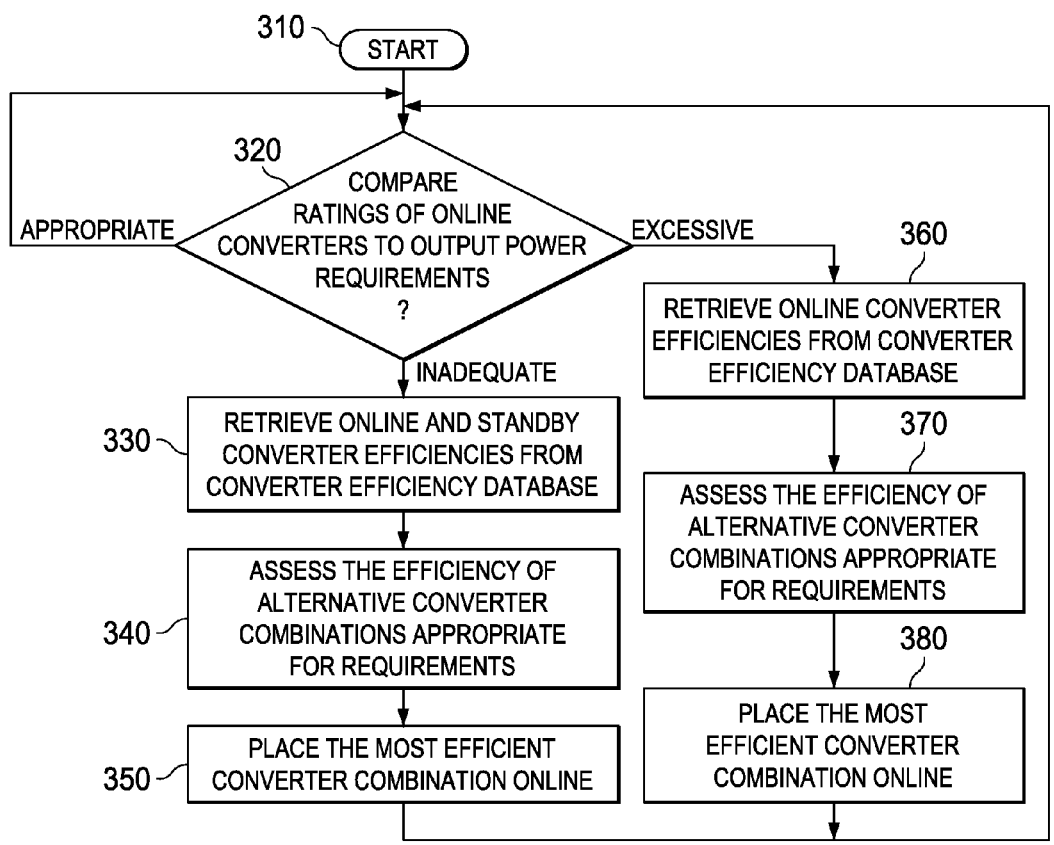
FIG. 3 is a flow diagram of one embodiment of a method of controlling converters of disparate type carried out according to the principles of the invention.

Having described one embodiment of a system controller constructed according to the principles of the invention, a related method of operation will now be described. FIG. 3 is a flow diagram of one embodiment of a method of controlling converters of disparate type carried out according to the principles of the invention. The method begins in a start step 310.

In a decisional step 320, the capacity (the combined ratings) of the online converters is compared to the output power requirement. The comparison has three possible outcomes: ratings are inadequate to meet the output power requirement, ratings are appropriate to the output power requirement (meet or reasonably exceed the output requirement), or ratings so exceed the output power requirement that they are deemed excessive.

In the illustrated embodiment, a margin is established of, e.g., 20%. If the ratings are less than 100% of the output power requirement, the capacity is inadequate. If the ratings are between 100% and 120% of the output power requirement, the capacity is appropriate. If the ratings are more than 120% of the output power requirement, the capacity is excessive. An alternative embodiment employs hysteresis to determine the margin if the load current is such that excessive mode switching occurs.

If the capacity is inadequate, online and standby converter efficiencies are retrieved from the converter efficiency database in a step 330. The efficiency of various alternative converter combinations that would be appropriate for the output power requirements are assessed in a step 340. The alternative converter combination having the greatest efficiency is then placed online in a step 350 to achieve a PEP for the CO. Most often, that combination will include all of the converters already online, and, in fact, one embodiment of the method considers only converter combinations that include most or all of the converters that are already online thereby to minimize excessive mode switching. After placing the alternative converter combination having the greatest efficiency online in the step 350, the decisional step 320 is repeated at a later time, perhaps periodically, to reassess converter capacity vis-à-vis output power requirements.

If the capacity is appropriate, nothing need be done. The decisional step 320 is then repeated at a later time to ensure that converter capacity remains appropriate.

If the capacity is excessive (spare capacity exists), online converter efficiencies are retrieved from the converter efficiency database in a step 360. The efficiency of various alternative converter combinations that would be appropriate for the output power requirements are assessed in a step 370. The alternative converter combination having the greatest efficiency is then placed online in a step 380 to achieve a PEP for the CO. Most often, that combination will include only the converters already online, and, in fact, one embodiment of the method considers only converter combinations that include a subset of the converters that are already online, again to minimize excessive mode switching. After placing one or more online converters on standby in the step 380, the decisional step 320 is repeated at a later time, perhaps periodically, to reassess converter capacity vis-à-vis output power requirements.

As stated above, the converter efficiency database 270 of FIG. 2 is configured to store data pertaining to the efficiency of converters. That data may be gathered in different ways. In one embodiment, the data is derived from factory specifications that are furnished for each converter. For example, efficiency may be derived from specified nominal input and output power. Alternatively, the specifications may explicitly state the efficiency of the converter. This data may then be manually entered into the converter output database 270. In yet another embodiment, factory calibration data particular to each converter may be gathered and entered into the converter output database 270. As in the first embodiment, the calibration data may take the form of input and output power from which efficiency may be derived or explicit efficiency data. In still another embodiment, the data may be gathered by querying the converters via the bi-directional link 180 of FIG. 1 to retrieve specifications from nonvolatile memories therein.

Figure 4:
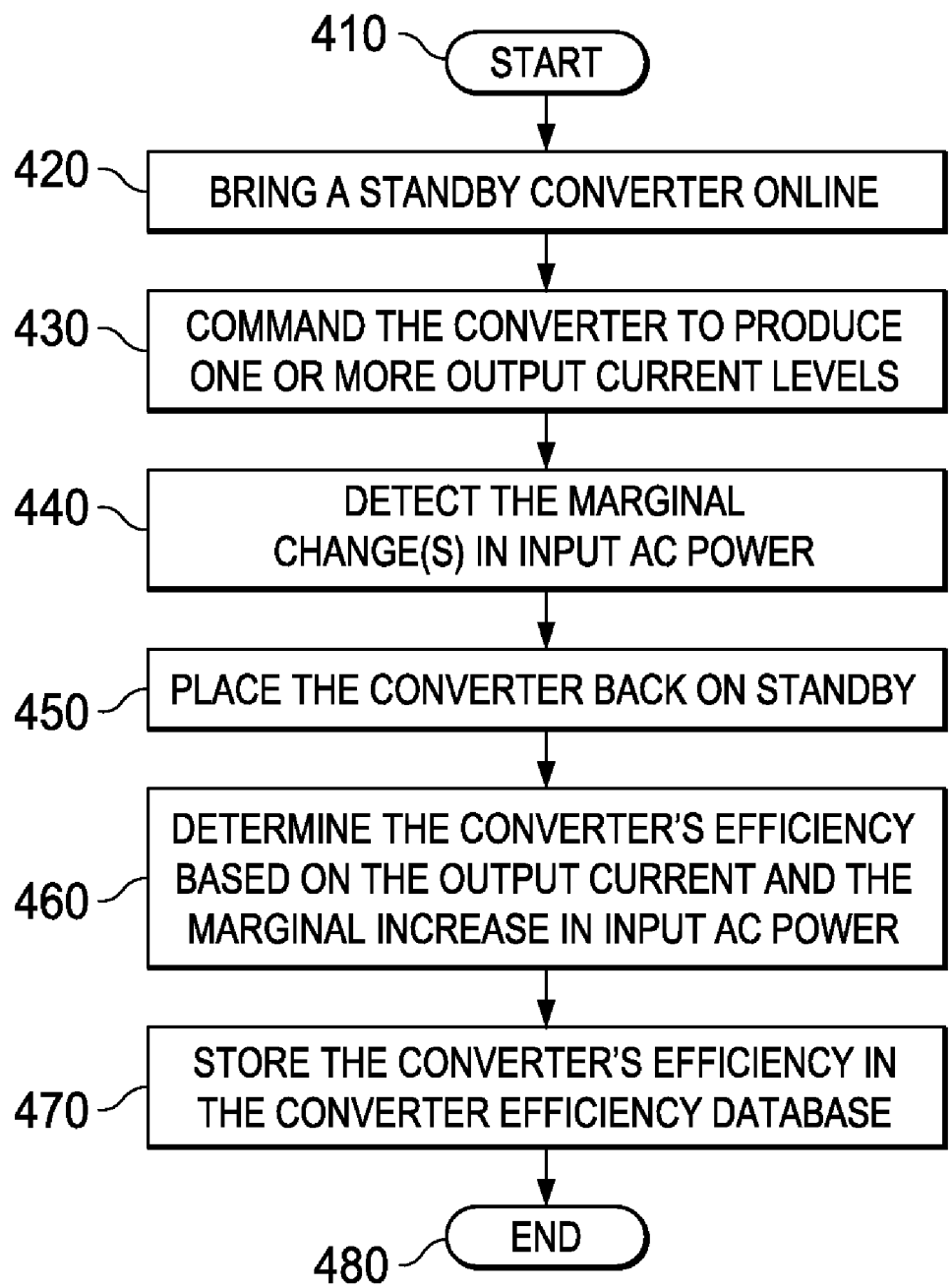
FIG. 4 is a flow diagram of one embodiment of a method of analyzing converter efficiency carried out according to the principles of the invention.

In yet still another embodiment, converter efficiency may be determined by monitoring its operation. FIG. 4 is a flow diagram illustrating this embodiment. The method begins in a start step 410. In a step 420, a standby converter is brought online. In a step 430, the converter is commanded to produce one or more output current levels. In a step 440, one or more marginal changes (e.g., increases) in input AC power are detected. In one embodiment, the overall AC current draw is detected (using, e.g., the AC power transducer 121 of FIG. 1). In another embodiment, the input AC current draw for the particular converter being analyzed is detected (using, e.g., an AC power transducer in the converter being analyzed, viz., the AC power transducers 141a, 141b of FIG. 1).

A single efficiency value for the converter may be derived by commanding the converter to produce a single output current level. Multiple efficiency values, indicating an efficiency curve, for the converter may be derived by commanding the converter to produce multiple, perhaps many, output current levels.

One or more efficiency values may likewise be determined for various output voltages. As described above, COs commonly have multiple DC output buses of different voltage. Efficiencies of converters likely depend upon output voltage. Therefore, the decision of which converters to place online may depend upon the output bus voltage or voltages involved.

The invention encompasses determining efficiency values for single and multiple output voltages.

After gathering input and output power levels, the converter may be placed back on standby in a step 450. In a step 460, the converter's efficiency may then be determined based on the output current level and the marginal change in input AC power. In a step 470, the converter's efficiency is then stored in the converter efficiency database 270 of FIG. 2. The method ends in an end step 480.

Those skilled in the art to which the invention relates will appreciate that other and further additions, deletions, substitutions and modifications may be made to the described embodiments without departing from the scope of the invention.

What is claimed is:

1. A converter controller embodied in a computer-readable non-transitory storage medium, comprising:
    a converter efficiency database configured to store data pertaining to efficiencies of converters, wherein said converters have disparate efficiencies;
    a power requirement assessor configured to compare ratings of online ones of said converters to an output power requirement of a given output power bus; and
    a controller mode selector coupled to said power requirement assessor and configured to retrieve online and standby converter efficiencies from said converter efficiency database, assess efficiencies of alternative converter combinations appropriate for said output power requirement and place one of said alternative converter combinations online based on both ratings and said efficiencies of said alternative converter combinations.

2. The controller as recited in claim 1 further comprising a converter efficiency analyzer coupled to said converter efficiency database and configured to analyze said converters to determine said efficiencies and provide said data to said converter efficiency database.

3. The controller as recited in claim 2 wherein said converter efficiency analyzer is configured to bring a particular converter online, command said particular converter to produce at least one output current level, detect a marginal change in input power, place said particular converter back on standby and determine an efficiency of said particular converter based on said output current level and said marginal change.

4. The controller as recited in claim 3 wherein said converter efficiency analyzer is configured to detect said marginal change by detecting a selected one of:
    a marginal change in overall input power to said converters, and
    a marginal change in input power to said particular converter.

5. The controller as recited in claim 1 wherein said power requirement assessor is configured to determine whether said ratings of said online converters are inadequate, appropriate or excessive with respect to said output power requirement.

6. The controller as recited in claim 1 wherein said power requirement assessor is further configured to gather data regarding ratings of online ones of said converters.

7. The controller as recited in claim 1 wherein said converters are rectifiers.

8. A method of controlling converters, comprising:
    comparing ratings of online ones of said converters to an output power requirement of a given output power bus, wherein said converters have disparate efficiencies;
    retrieving online and standby converter efficiencies;
    assessing efficiencies of alternative converter combinations appropriate for said output power requirement; and
    placing one of said alternative converter combinations online based on both ratings and said efficiencies of said alternative converter combinations.

9. The method as recited in claim 8 further comprising analyzing said converters to determine said efficiencies.

10. The method as recited in claim 9 wherein said analyzing comprises:
    bringing a particular converter online;
    commanding said particular converter to produce at least one output current level;
    detecting a marginal change in input power;
    placing said particular converter back on standby; and
    determining an efficiency of said particular converter based on said output current level and said marginal change.

11. The method as recited in claim 10 wherein said detecting comprises detecting a selected one of:
    a marginal change in overall input power to said converters, and
    a marginal change in input power to said particular converter.

12. The method as recited in claim 8 wherein said comparing comprises determining whether said ratings of said online converters are inadequate, appropriate or excessive with respect to said output power requirement.

13. The method as recited in claim 8 further comprising gathering data regarding ratings of online ones of said converters.

14. The method as recited in claim 8 wherein said converters are rectifiers.

15. A controller embodied in a computer-readable non-transitory storage medium for controlling converters of disparate type, comprising:
    a converter efficiency database configured to store data pertaining to efficiencies of said converters, wherein said converters have disparate efficiencies;
    a power requirement assessor configured to gather data regarding ratings of said converters and compare ratings of said online ones of said converters to an output power requirement of a given output power bus;
    a controller mode selector coupled to said power requirement assessor and configured to retrieve online and standby converter efficiencies from said converter efficiency database, assess efficiencies of alternative converter combinations appropriate for said output power requirement and place one of said alternative converter combinations online based on both ratings and said efficiencies of said alternative converter combinations; and
    a converter efficiency analyzer coupled to said converter efficiency database and configured to analyze said converters to determine said efficiencies and provide said data to said converter efficiency database.

16. The controller as recited in claim 15 wherein said converter efficiency analyzer is configured to bring a particular converter online, command said particular converter to produce at least one output current level, detect a marginal change in input power, place said particular converter back on standby and determine an efficiency of said particular converter based on said output current level and said marginal change.

17. The controller as recited in claim 16 wherein said converter efficiency analyzer is configured to detect said marginal change by detecting a selected one of:
    a marginal change in overall input power to said converters, and
    a marginal change in input power to said particular converter.

18. The controller as recited in claim 15 wherein said power requirement assessor is configured to determine whether said ratings of said online converters are inadequate, appropriate or excessive with respect to said output power requirement.

19. The controller as recited in claim 15 wherein said converters are rectifiers.

20. The controller as recited in claim 15 wherein said power requirement assessor and said controller mode selector are embodied in at least one sequence of computer instructions.

* * * * *